US010923281B2

(12) United States Patent
Sano (10) Patent No.: US 10,923,281 B2
(45) Date of Patent: Feb. 16, 2021

(54) CAPACITOR

(71) Applicant: Panasonic Intellectual Property Management Co., Ltd., Osaka (JP)

(72) Inventor: Masahito Sano, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 16/410,323

(22) Filed: May 13, 2019

(65) Prior Publication Data

US 2019/0267191 A1    Aug. 29, 2019

Related U.S. Application Data

(63) Continuation of application No. PCT/JP2017/034232, filed on Sep. 22, 2017.

(30) Foreign Application Priority Data

Nov. 29, 2016    (JP) ................. 2016-230767

(51) Int. Cl.
*H01G 4/224*    (2006.01)
*H01G 4/33*    (2006.01)
*H01G 2/10*    (2006.01)

(52) U.S. Cl.
CPC ............. *H01G 4/224* (2013.01); *H01G 2/10* (2013.01); *H01G 4/33* (2013.01)

(58) Field of Classification Search
CPC ............. H01G 2/10; H01G 4/224; H01G 2/14
See application file for complete search history.

(56) References Cited

U.S. PATENT DOCUMENTS

| 2,004,647 | A | * | 6/1935 | Beer |
| 2,057,790 | A | * | 10/1936 | Potter |
| 2,127,352 | A | * | 8/1938 | Dubilier |
| 3,831,265 | A | * | 8/1974 | Louzen |
| 4,109,291 | A | * | 8/1978 | Bozzini |
| 2008/0068775 | A1 | | 3/2008 | Imamura et al. |

FOREIGN PATENT DOCUMENTS

JP    2008-078167    4/2008

OTHER PUBLICATIONS

International Search Report of PCT application No. PCT/JP2017/034232 dated Dec. 12, 2017.

* cited by examiner

*Primary Examiner* — Eric W Thomas
(74) *Attorney, Agent, or Firm* — McDermott Will and Emery LLP (57) ABSTRACT

A capacitor includes: a capacitor element; a case that houses the capacitor element; and a filler resin that fills an interior of the case. The case includes a case body and a lid. The case body includes a bottom wall, an inner wall having a tube shape, an outer wall having a tube shape and surrounding the inner wall; and a coupler that couples the inner wall to the outer wall. The inner wall rises from a peripheral edge of the bottom wall. The outer wall extends further outward than the bottom wall in a direction from the case body to the lid. The coupler forms a first gap between the inner wall and the outer wall. The bottom wall, the inner wall, the outer wall, and the coupler are integrally formed. The lid closes an opening of the outer wall to form a second gap between the lid and the bottom wall.

5 Claims, 10 Drawing Sheets

CAPACITOR

RELATED APPLICATIONS

This application is a continuation of the PCT International Application No. PCT/JP2017/034232 filed on Sep. 22, 2017, which claims the benefit of foreign priority of Japanese patent application No. 2016-230767 filed on Nov. 29, 2016, the contents all of which are incorporated herein by reference.

BACKGROUND

1. Technical Field

The present disclosure relates to a capacitor.

2. Description of the Related Art

Conventionally, there has been known a case-mold-type capacitor in which a capacitor element with bus bars connected thereto is accommodated in a case having an opening at the top, and an interior of the case is filled with a filler resin, such as an epoxy resin.

In this capacitor, when an AC voltage is applied to the capacitor element, the capacitor element vibrates, and noise caused by this vibration is likely to occur. In view of this, in order to suppress leakage of noise to the outside of the case, a side surface (peripheral surface) and a bottom surface of the case can each be constituted by two wall portions that have a gap therebetween.

If the side surface and the bottom surface of the case have a double-walled structure in this manner, it is difficult to produce the case with a single member. Therefore, the case can typically be produced by joining two members.

A case-mold-type capacitor in which a case is constituted by an inner case made of resin and an outer case made of metal which houses the inner case is described in Unexamined Japanese Patent Publication No. 2008-78167. A joint is provided at an upper portion of a side surface of the inner case so as to protrude outward. Meanwhile, a joint having a recessed shape is provided at an upper portion of a side surface of the outer case, and the joint of the inner case is fitted from above into the joint. By fastening the two joints with a bolt or the like, the inner case and the outer case are joined to form a single piece.

SUMMARY

A capacitor according to a principal aspect of the present disclosure includes: a capacitor element; a case that houses the capacitor element; and a filler resin that fills an interior of the case. The case includes a case body and a lid. The case body includes: a bottom wall; an inner wall having a tube shape; an outer wall having a tube shape and surrounding the inner wall; and a coupler that couples the inner wall to the outer wall. Here, the inner wall rises from a peripheral edge of the bottom wall. The outer wall extends further outward than the bottom wall in a direction from the case body to the lid. The direction is perpendicular to a main surface of the bottom wall. The coupler forms a first gap between the inner wall and the outer wall. The bottom wall, the inner wall, the outer wall, and the coupler are integrally formed. The lid closes an opening of the outer wall to form a second gap between the lid and the bottom wall. The opening faces the bottom wall.

According to the present disclosure, it can be expected that the case having a double-walled structure provides an excellent noise suppression effect.

Effects or meanings of the present disclosure will be further clarified in the following description of exemplary embodiments. However, the exemplary embodiments described below are merely examples of practicing the present disclosure, and the present disclosure is not at all limited to the examples described in the following exemplary embodiments.

DETAILED DESCRIPTION OF EMBODIMENT

In the case disclosed in Unexamined Japanese Patent Publication No. 2008-78167, if dimensional accuracy in fit between the two joints and dimensional accuracy in bolt-holes formed in the two joints are too strict, the two joints do not easily fit together or the bolt becomes difficult to fasten when the two holes are misaligned. In order to facilitate the joining of the inner case and the outer case, a certain amount of clearance in front-rear direction and left-right direction is preferably provided between the two joints. Meanwhile, a diameter of the hole in the joint of the inner case is preferably made larger than that of the hole in the outer case.

However, in this case, when the case is produced, the inner case becomes susceptible to misalignment in the front-rear and left-right directions from an intended position with respect to the outer case. Further, the gap between the inner case and the outer case is likely to decrease at a site where the side surface of the inner case is located closer to the side surface of the outer case. This leads to unevenness in the gap in a direction of the side surface (peripheral surface) of the case, and there is a concern that it becomes difficult to provide a stable noise suppression effect.

In view of the above problems, the present disclosure provides a capacitor in which a case having a double-walled structure can be expected to provide an excellent noise suppression effect.

With reference to the accompanying drawings, a film capacitor, which is an exemplary embodiment of a capacitor of the present disclosure, will be described below. For the sake of convenience, directions including front and rear, left and right, and up and down are added to the drawings as appropriate. Note that directions in the drawings are not absolute directions but relative directions of the film capacitor.

First Exemplary Embodiment

Hereinafter, film capacitor 1A according to a first exemplary embodiment will be described.

In the present exemplary embodiment, internally threaded portion 37 is an example of a "first threaded portion" recited in the claims. Furthermore, externally threaded portion 43 is an example of a "second threaded portion" recited in the claims.

However, the above description is only intended to define correspondences between components in the claims and components in the exemplary embodiment. The correspondences described above do not limit the scope of the disclosure in the claims to the configuration described in the exemplary embodiment.

Figure 1A:
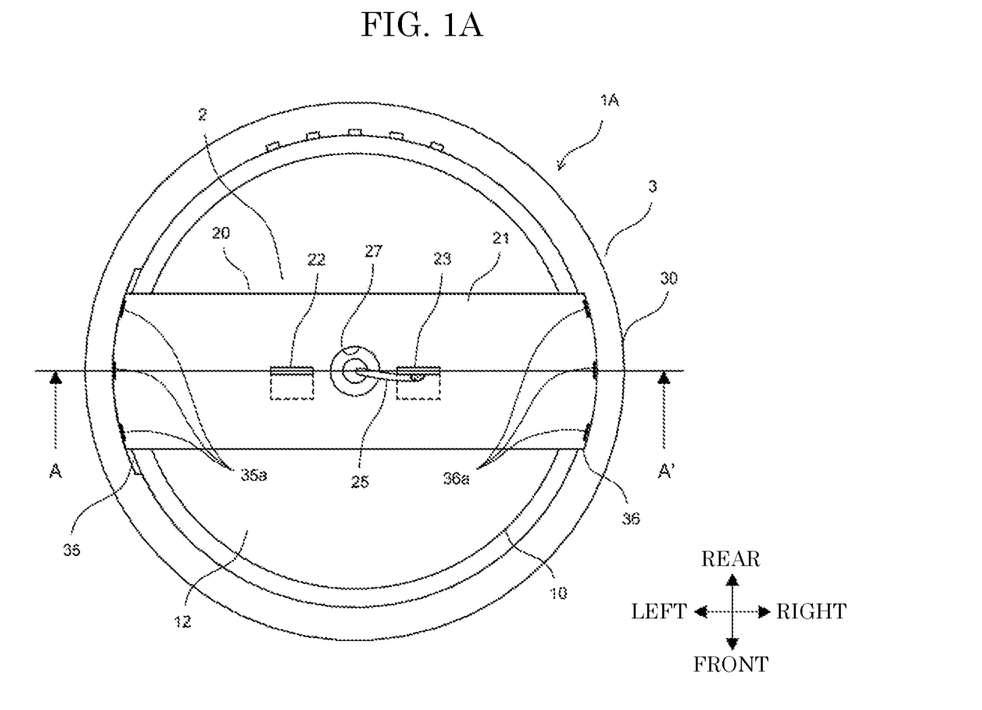
FIG. 1A is a plan view illustrating a film capacitor according to a first exemplary embodiment.
Figure 1B:
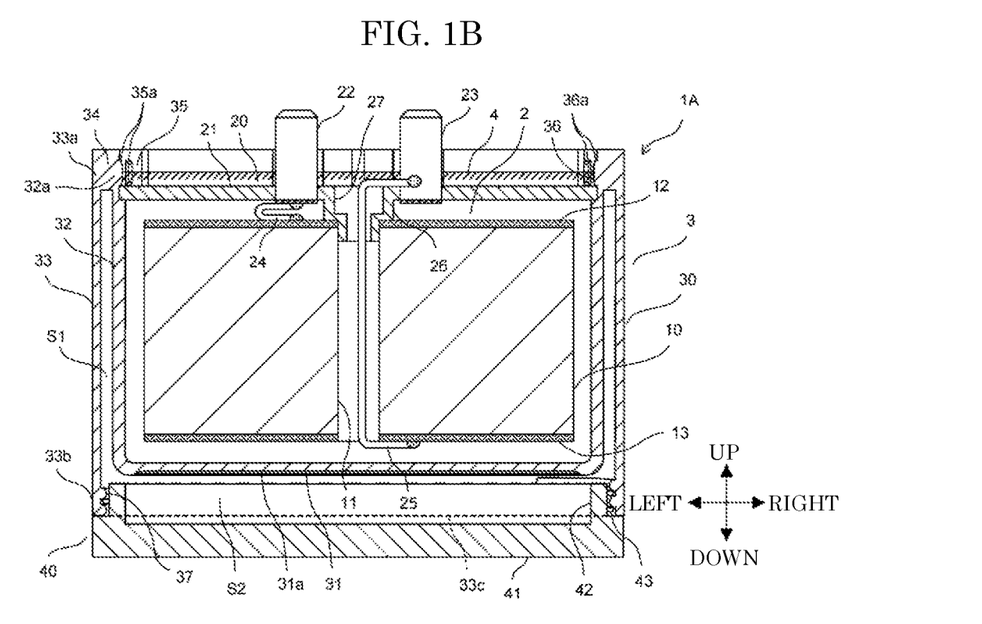
FIG. 1B is a cross-sectional view taken along line A-A' in FIG. 1A.
Figure 2A:
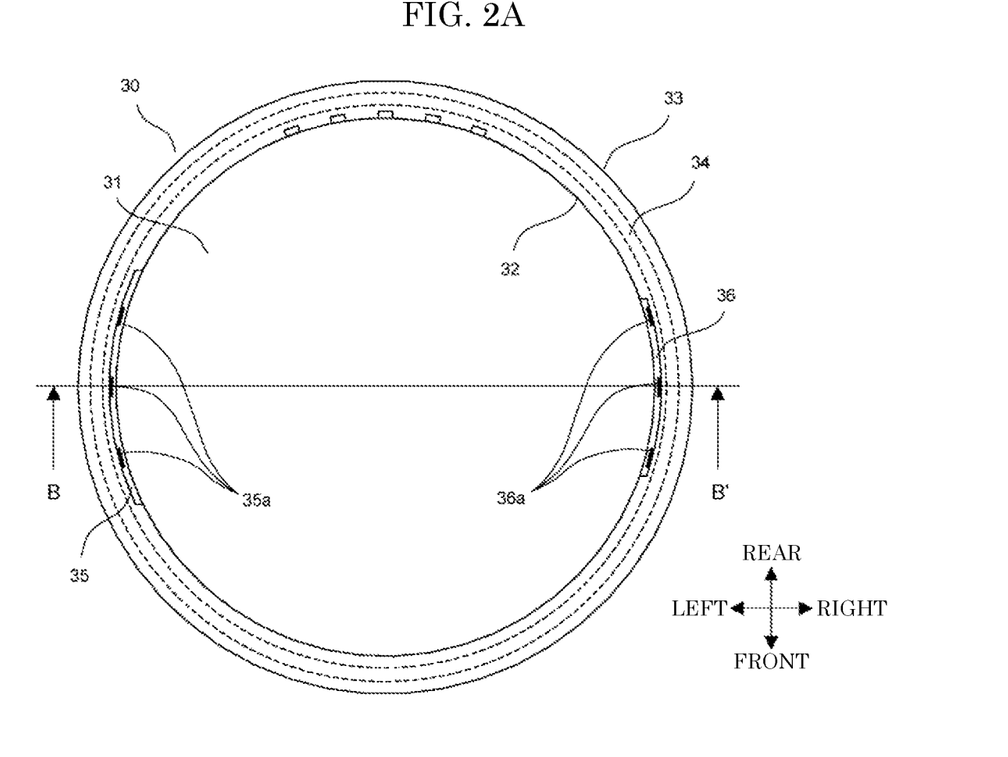
FIG. 2A is a plan view illustrating a case body according to the first exemplary embodiment.
Figure 2B:
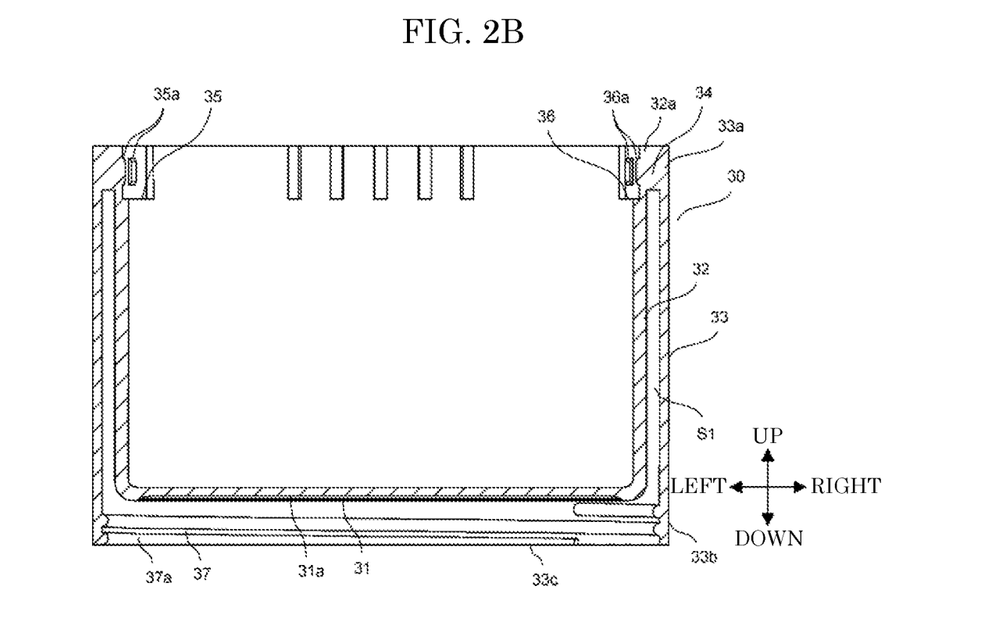
FIG. 2B is a cross-sectional view taken along line B-B' in FIG. 2A.
Figure 3:
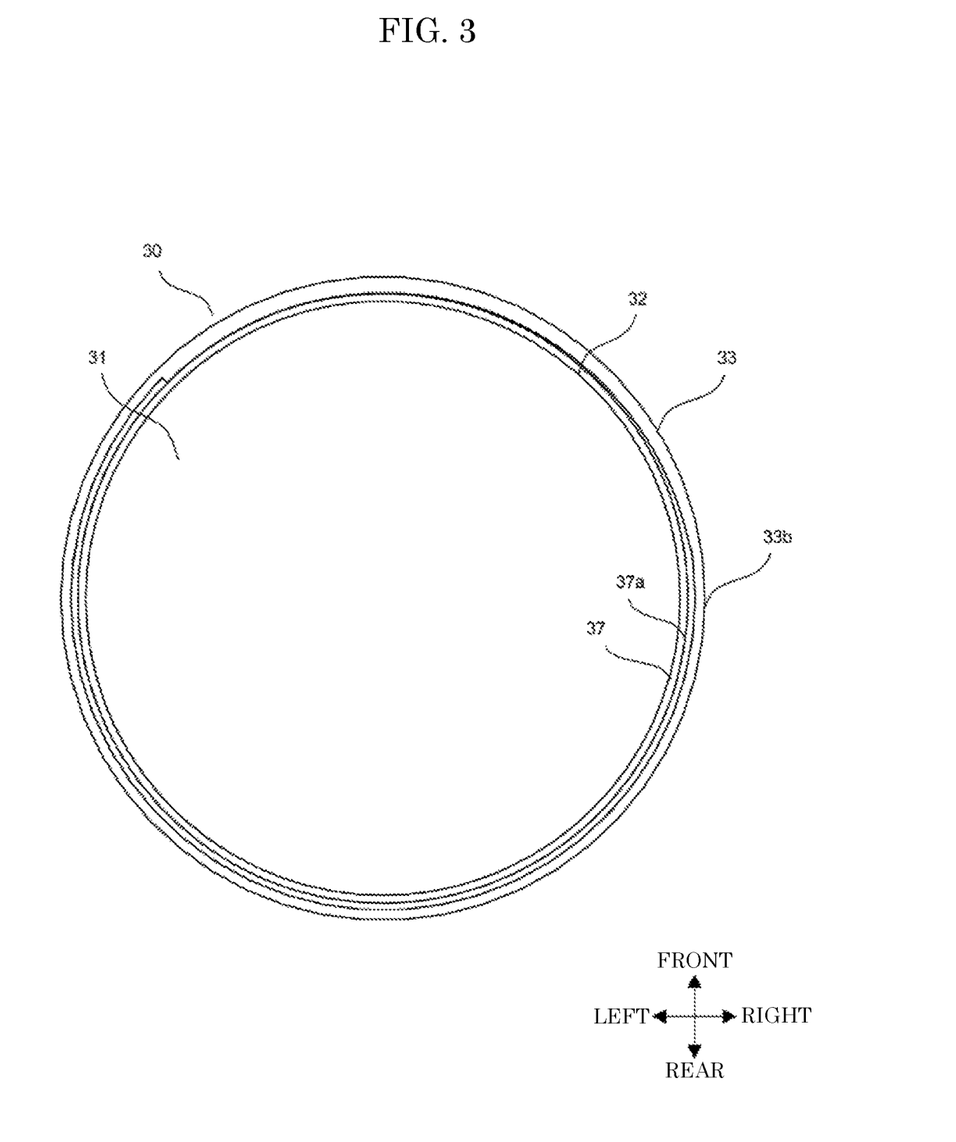
FIG. 3 is a bottom plan view illustrating the case body according to the first exemplary embodiment.
Figure 4A:
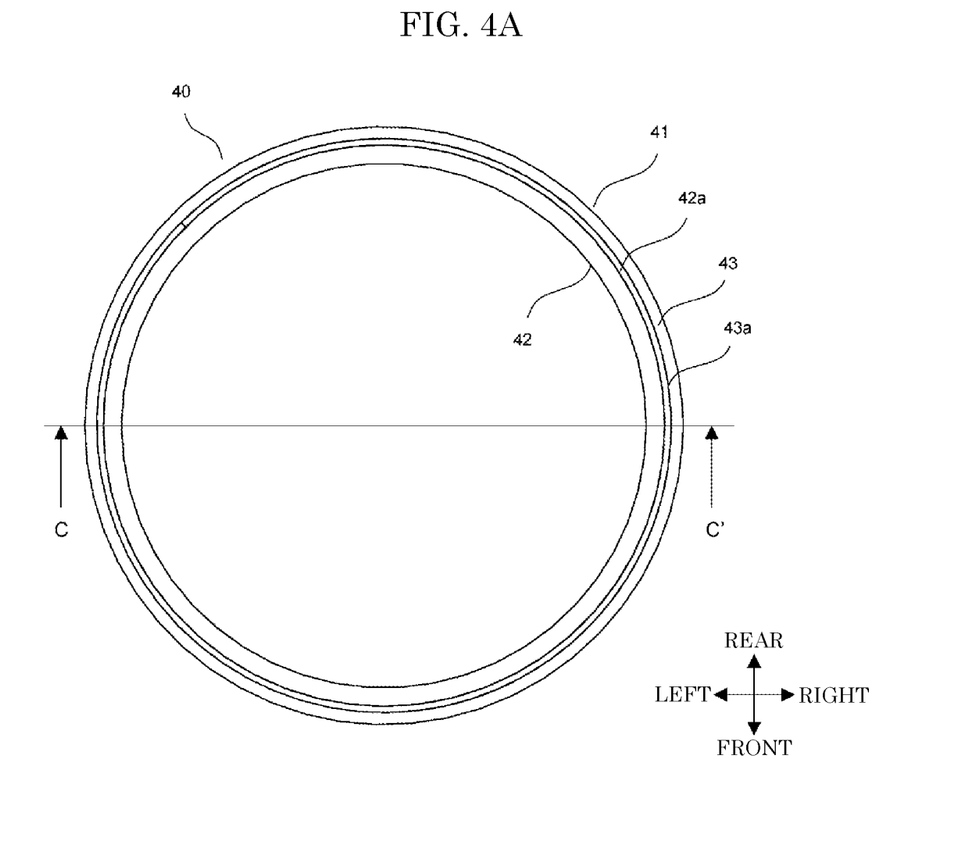
FIG. 4A is a plan view illustrating a lid according to the first exemplary embodiment.
Figure 4B:
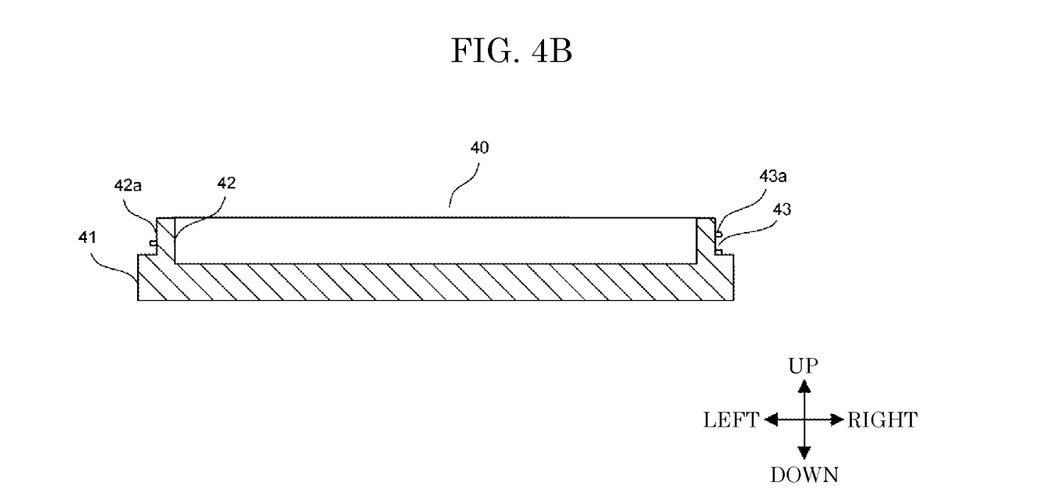
FIG. 4B is a cross-sectional view taken along line C-C' in FIG. 4A.

FIG. 1A is a plan view illustrating film capacitor 1A according to the first exemplary embodiment, and FIG. 1B is a cross-sectional view taken along line A-A' in FIG. 1A. FIG. 2A is a plan view illustrating case body 30 according to the first exemplary embodiment, and FIG. 2B is a cross-sectional view taken along line B-B' in FIG. 2A. FIG. 3 is a bottom plan view illustrating case body 30 according to the first exemplary embodiment. FIG. 4A is a plan view illustrating lid 40 according to the first exemplary embodiment, and FIG. 4B is a cross-sectional view taken along line C-C' in FIG. 4A. Note that, for the sake of convenience, filler resin 4 is not illustrated in FIG. 1A and, in FIG. 1B, filler resin 4 is transparent and only an upper surface of filler resin 4 is hatched.

Film capacitor 1A includes capacitor element unit 2, case 3, and filler resin 4. Case 3 houses capacitor element unit 2 and is filled with filler resin 4. Filler resin 4 is made of a thermosetting resin, such as an epoxy resin, is injected into case 3 in a molten state, and is cured by heating case 3. Filler resin 4 covers most part of capacitor element unit 2 and protects the most part from moisture and impact.

Capacitor element unit 2 includes capacitor element 10 and lead-out terminal 20 attached to capacitor element 10. Capacitor element 10 is formed by stacking two metalized films, which are made by vapor-depositing aluminum onto dielectric films, and winding the stacked metalized films, and has a substantially circular columnar shape. Circular through-hole 11 that penetrates through capacitor element 10 in the up-down direction is formed in a central portion of capacitor element 10. Furthermore, first electrode 12 is formed on an upper end surface of capacitor element 10 by spraying metal, such as zinc, and similarly, second electrode 13 is formed on a lower end surface of capacitor element 10 by spraying metal, such as zinc.

Note that capacitor element 10 may be formed from a metalized film on which other metal, such as zinc or magnesium, is vapor-deposited, in addition to the metalized film made by vapor-depositing aluminum onto the dielectric film. Alternatively, capacitor element 10 may be formed from a metalized film on which a plurality of metals among these metals are vapor-deposited, or may be formed from a metalized film on which an alloy of these metals is vapor-deposited.

Lead-out terminal 20 includes terminal attaching plate 21, first terminal 22, second terminal 23, first lead wire 24, and second lead wire 25. Terminal attaching plate 21 is formed from a resin material, and has a plate shape that is elongated in the left-right direction. Projection 26 protruding downward is formed on terminal attaching plate 21, and has a leading end that is fitted into through-hole 11 of capacitor element 10. Insertion hole 27 that is continuous with through-hole 11 is formed in projection 26.

First terminal 22 and second terminal 23 are formed from metallic material having excellent conductivity, such as copper, and have a substantially L shape. First terminal 22 and second terminal 23 are attached to each side of projection 26 of terminal attaching plate 21. First terminal 22 and second terminal 23 protrude upward from an upper surface of terminal attaching plate 21, and have base ends facing a lower surface of terminal attaching plate 21.

First lead wire 24 electrically connects first terminal 22 to first electrode 12 of capacitor element 10. Second lead wire 25 electrically connects second terminal 23 to second electrode 13 of capacitor element 10. Second lead wire 25 is passed through insertion hole 27 of terminal attaching plate 21 and through-hole 11 of capacitor element 10 so as to connect second terminal 23 and second electrode 13. Examples of methods for connecting first lead wire 24 to first terminal 22 and first electrode 12 and methods for connecting second lead wire 25 to second terminal 23 and second electrode 13 include soldering and welding.

Case 3 is a container with a bottom and a double-walled structure having a circular tube shape, and includes case body 30 and lid 40. Case body 30 and lid 40 are formed from the same resin material having excellent moisture resistance and heat resistance, such as a polyphenylene sulfide (PPS) resin.

Case body 30 includes bottom wall 31 having a circular shape, inner wall 32 having a circular tube shape which rises from a peripheral edge of bottom wall 31, outer wall 33 having a circular tube shape which surrounds inner wall 32, and coupler 34 that couples inner wall 32 to outer wall 33. Case body 30 is configured by integrally forming them. Recess 31a that is slightly recessed is formed in a lower surface of bottom wall 31.

First receiving portion 35 and second receiving portion 36 are formed on a left side and a right side, respectively, of upper end 32a of inner wall 32. Three first claws 35a are formed on first receiving portion 35. Three second claws 36a are formed on second receiving portion 36.

Outer wall 33 extends in the downward direction (a direction from case body 30 to lid 40, which is perpendicular to a main surface of bottom wall 31) and further outward than bottom wall 31. Open end portion 33b of outer wall 33 is located below bottom wall 31. On an inside surface of open end portion 33b, internally threaded portion 37 is formed by ribs 37a running spirally. Coupler 34 is continuously provided between an entire periphery of upper end 32a of inner wall 32 (the end at far side from bottom wall 31) and an entire periphery of upper end 33a of outer wall 33 that faces upper end 32a. And Coupler 34 couples inner wall 32 to outer wall 33 in such a manner that gap S1 is formed between inner wall 32 and outer wall 33.

Lid 40 closes open face 33c of outer wall 33, which faces bottom wall 31, to form gap S2 between lid 40 and bottom wall 31. Lid 40 includes lid body 41 having a disc shape and fitting portion 42 having a low-height circular tube shape. Fitting portion 42 is formed at an upper surface of lid body 41. On peripheral wall surface 42a of fitting portion 42, externally threaded portion 43 is formed by ribs 43a running spirally.

When attaching lid 40 to case body 30, fitting portion 42 is fitted into open end portion 33b of outer wall 33 while rotating lid body 41 so that externally threaded portion 43 meshes with internally threaded portion 37. When fitting portion 42 is fully inserted and lid body 41 abuts against outer wall 33, attachment of lid 40 to case body 30 is completed and lid 40 is fixed to case body 30.

Capacitor element unit 2 is held in a state floating from bottom wall 31, within case 3, by installing terminal attaching plate 21 laid across first receiving portion 35 and second receiving portion 36 of inner wall 32. The upper surface of filler resin 4 is located above terminal attaching plate 21, and capacitor element unit 2 is fixed within case 3 by cured filler resin 4. Both ends of terminal attaching plate 21 are held by first claws 35a and second claws 36a, respectively. Hence, terminal attaching plate 21 is unlikely to come off upward. In a state in which capacitor element unit 2 is housed in case 3, each of a leading end of first terminal 22 and a leading end of second terminal 23 protrudes outward from case 3.

Figure 5:
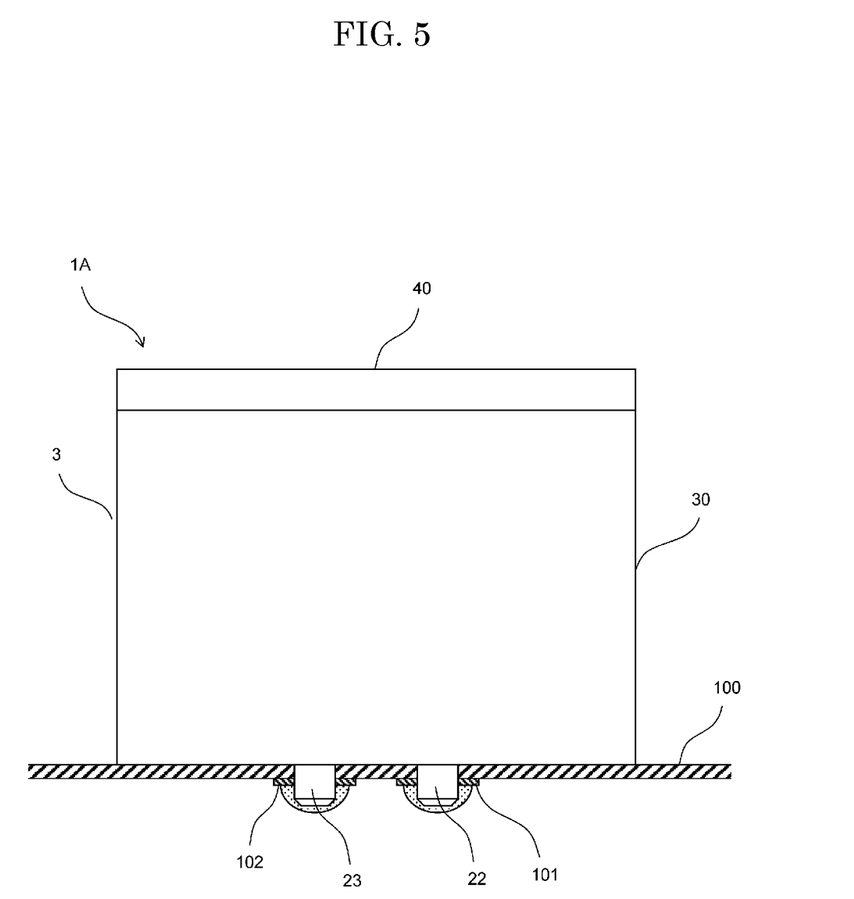
FIG. 5 is diagram illustrating a state in which the film capacitor is mounted on a printed substrate according to the first exemplary embodiment.

FIG. 5 is diagram illustrating a state in which film capacitor 1A is mounted on printed substrate 100 according to the first exemplary embodiment.

As shown in FIG. 5, film capacitor 1A is mounted directly on printed substrate 100. Conductive patterns 101, 102 that correspond to first terminal 22 and second terminal 23, respectively, of film capacitor 1A are formed on a back surface of printed substrate 100. First terminal 22 and second terminal 23 penetrate through printed substrate 100 and electrically connected to conductive patterns 101, 102 by soldering, respectively. An opening face of case 3 is brought into contact with printed substrate 100 and covered with printed substrate 100.

As shown in FIG. 5, in a state in which film capacitor 1A is mounted on printed substrate 100, in the upward direction, the double-walled structure of bottom wall 31 and lid 40 having gap (air layer) S2 therebetween suppresses leakage of noise caused by vibration of capacitor element 10 from case 3. In the front-rear and left-right directions, the double-walled structure of inner wall 32 and outer wall 33 having gap (air layer) Si therebetween suppresses leakage of noise from case 3. In the downward direction, since filler resin 4 has a layer thicker than other portions and the opening face of case 3 is closed by printed substrate 100, leakage of noise from case 3 is suppressed.

Effects of First Exemplary Embodiment

As stated above, the present exemplary embodiment exerts the following effects.

Since case 3 has a double-walled structure that is composed of inner wall 32 and outer wall 33, and bottom wall 31 and lid 40, it is possible to suppress leakage of noise caused by vibration of capacitor element 10 from case 3. Additionally, since inner wall 32 and outer wall 33 are integrally formed, gap S1 between inner wall 32 and outer wall 33 does not vary depending on manufacturing operation conditions, intended gap S1 can be ensured, and a stable noise suppression effect is expected.

Furthermore, outer wall 33 is formed in a circular tube shape and lid 40 is fixed to open end portion 33b of outer wall 33 by a screw method, thereby facilitating the attaching of lid 40 to case body 30 and allowing lid 40 to be firmly fixed to case body 30. Further, even if it becomes necessary to fill gap S1 and gap S2 of case 3 with a noise-absorbing material to further suppress noise leakage after film capacitor 1A is mounted on printed substrate 100 as shown in FIG. 5, it is possible to easily remove lid 40 from case body 30 and fill the noise-absorbing material while film capacitor 1A is mounted on printed substrate 100.

Further, since case 3 is configured such that only upper end 32a of inner wall 32 and upper end 33a of outer wall 33 are coupled by coupler 34, propagation of vibration (noise) from inner wall 32 to outer wall 33 through coupler 34 can be reduced and improvement in noise suppression effect can be expected.

Second Exemplary Embodiment

Hereinafter, film capacitor 1B according to a second exemplary embodiment will be described.

Figure 6A:
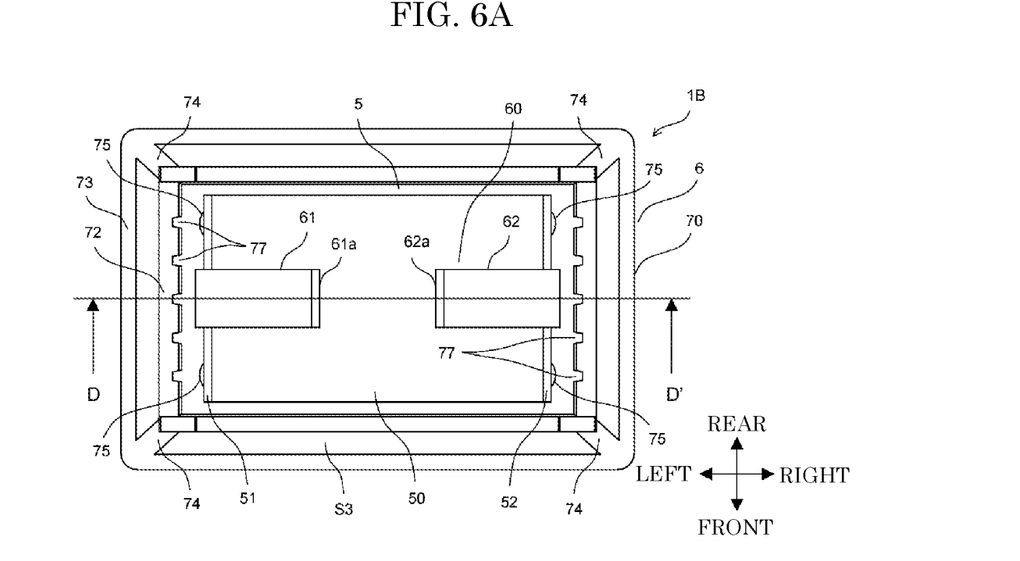
FIG. 6A is a plan view illustrating a film capacitor according to a second exemplary embodiment.
Figure 6B:
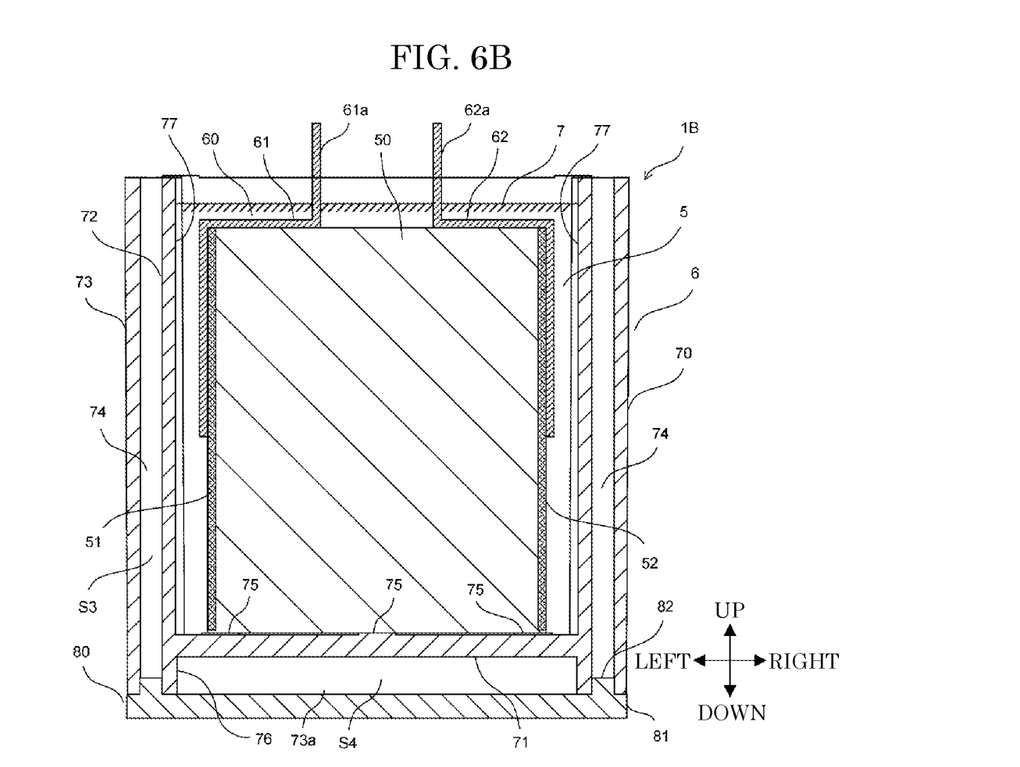
FIG. 6B is a cross-sectional view taken along line D-D' in FIG. 6A.
Figure 7A:
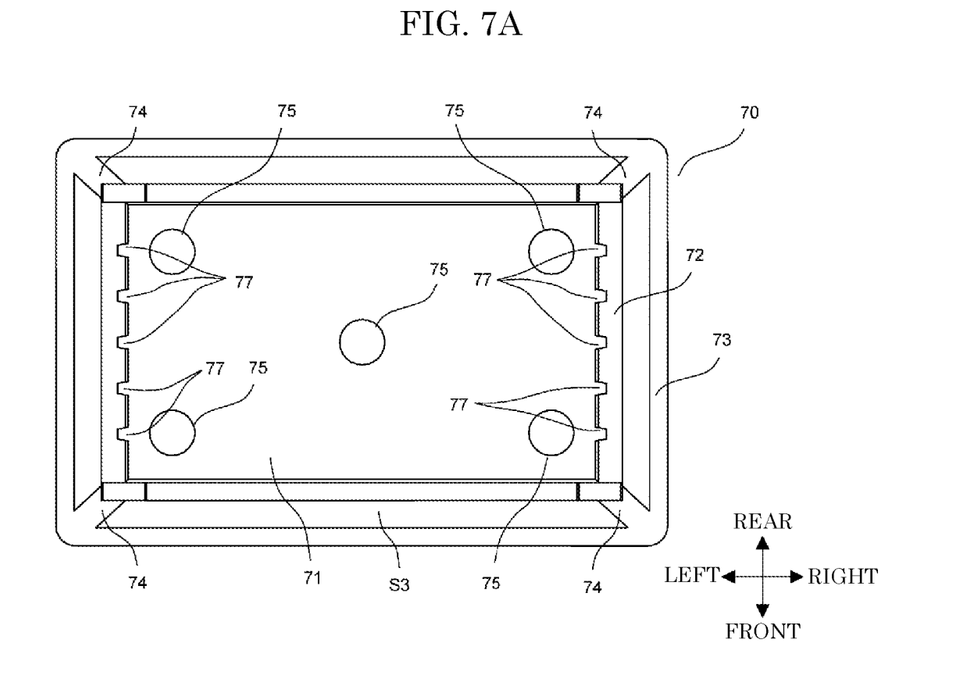
FIG. 7A is a plan view illustrating a case body according to the second exemplary embodiment.
Figure 7B:
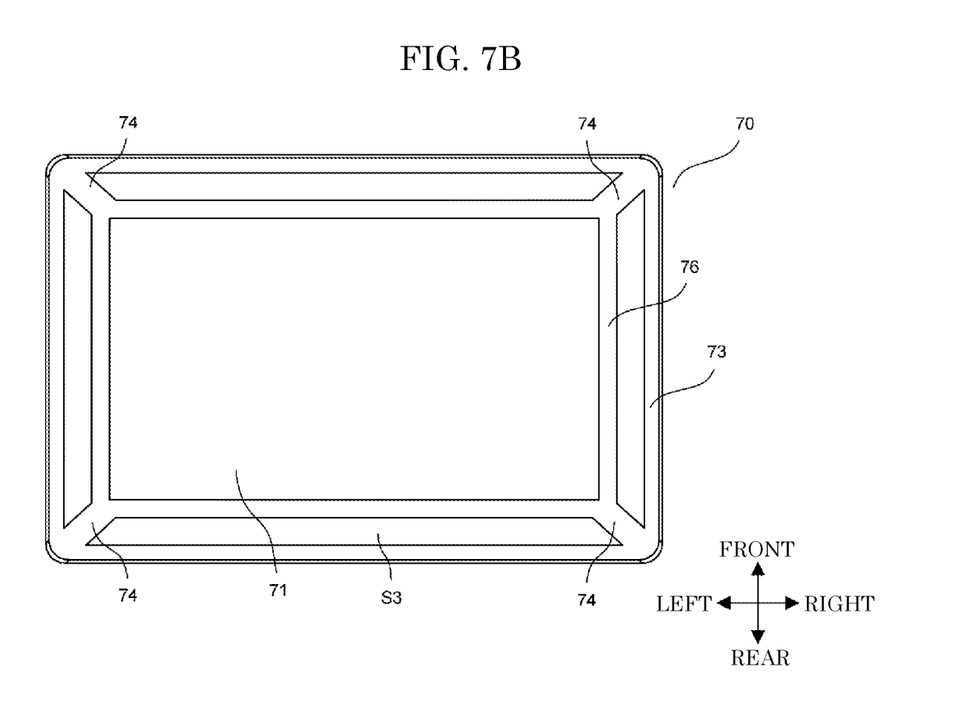
FIG. 7B is a bottom plan view illustrating the case body according to the second exemplary embodiment.
Figure 8A:
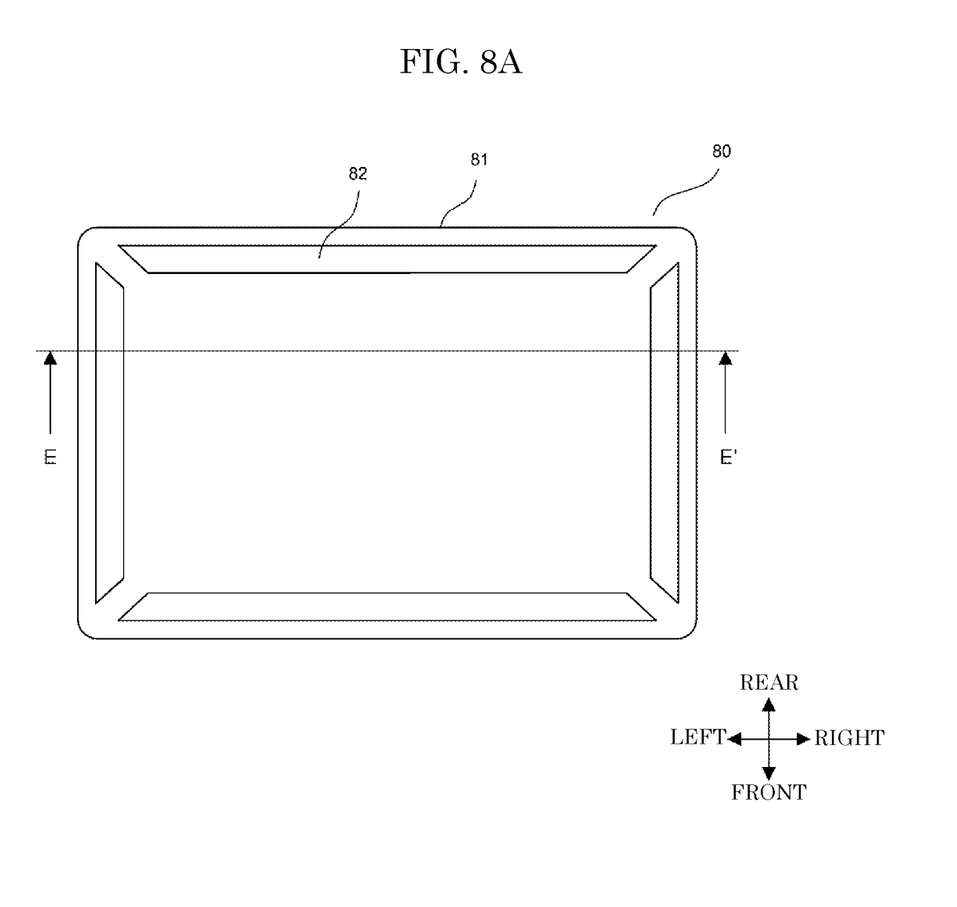
FIG. 8A is a plan view illustrating a lid according to the second exemplary embodiment.
Figure 8B:
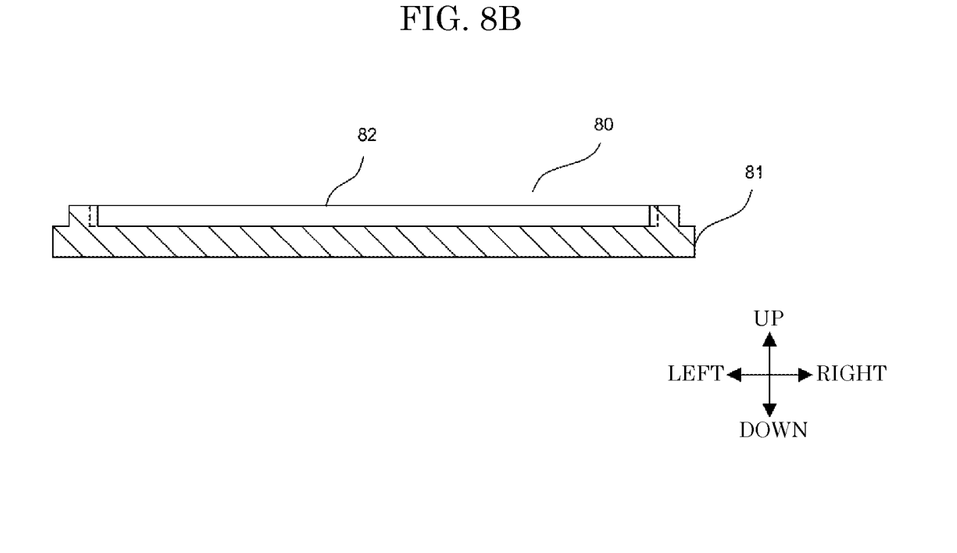
FIG. 8B is a cross-sectional view taken along line E-E' in FIG. 8A.

FIG. 6A is a plan view illustrating film capacitor 1B according to the second exemplary embodiment, and FIG. 6B is a cross-sectional view taken along line D-D' in FIG. 6A. FIG. 7A is a plan view illustrating case body 70 according to the second exemplary embodiment, and FIG. 7B is a bottom plan view illustrating case body 70 according to the second exemplary embodiment. FIG. 8A is a plan view illustrating lid 80 according to the second exemplary embodiment, and FIG. 8B is a cross-sectional view taken along line E-E' in FIG. 8A. Note that, for the sake of convenience, filler resin 7 is not illustrated in FIG. 6A, and in FIG. 6B, filler resin 7 is transparent and only an upper surface of filler resin 7 is hatched.

Film capacitor 1B includes capacitor element unit 5, case 6, and filler resin 7. Case 6 houses capacitor element unit 5 and is filled with filler resin 7. Similar to filler resin 4 in the first exemplary embodiment, filler resin 7 is made of a thermosetting resin, such as an epoxy resin, covers most part of capacitor element unit 5, and protects the most part from moisture and impact.

Capacitor element unit 5 includes capacitor element 50 and lead-out terminal 60 attached to capacitor element 50. Capacitor element 50 is formed by stacking two metalized films, which are made by vapor-depositing aluminum onto dielectric films, winding or laminating the stacked metalized films, and pressing the result to be flattened in shape, and has a columnar shape that is of substantially oval cross-section. First electrode 51 is formed on a left end surface of capacitor element 50 by spraying metal, such as zinc, and similarly, second electrode 52 is formed on a right end surface of capacitor element 50 by spraying metal, such as zinc.

Note that capacitor element 50 may be formed from a metalized film on which other metal, such as zinc or magnesium, is vapor-deposited, in addition to the metalized film made by vapor-depositing aluminum onto the dielectric film. Alternatively, capacitor element 50 may be formed from a metalized film on which a plurality of metals among these metals are vapor-deposited, or may be formed from a metalized film on which an alloy of these metals is vapor-deposited.

Lead-out terminal 60 includes first bus bar 61 and second bus bar 62. First bus bar 61 and second bus bar 62 are each formed by bending a metal material having excellent conductivity, such as a copper plate, into a predetermined shape. First bus bar 61 has a base end that is electrically connected to first electrode 51 of capacitor element 50 by a connection method, such as soldering or welding, and a leading end that has first terminal 61a. Second bus bar 62 has a base end that is electrically connected to second electrode 52 of capacitor element 50 by a connection method, such as soldering or welding, and a leading end that has second terminal 62a.

Case 6 is a container with a bottom and a so-called double-walled structure having a rectangular tube shape, and includes case body 70 and lid 80. Case body 70 and lid 80 are formed from the same resin material having excellent moisture resistance and heat resistance, such as PPS.

Case body 70 is configured by integrally forming bottom wall 71 having a rectangular shape, inner wall 72 having a rectangular tube shape which rises from a peripheral edge of bottom wall 71, outer wall 73 having a rectangular tube shape and surrounding inner wall 72, and four couplers 74 that couple inner wall 72 to outer wall 73. Five projections 75 each having a disc shape are formed on an inner wall surface (upper surface) of bottom wall 71. Wall 76 having a low-height rectangular tube shape is formed on an outer surface (lower surface) of bottom wall 71 so as to follow the peripheral edge of bottom wall 71.

A plurality of grooves 77 extending in the up-down direction are formed on each of left inner wall surface and right inner wall surface of inner wall 72. Outer wall 73 extends in the downward direction (a direction from case body 70 to lid 80, which is perpendicular to a main surface of bottom wall 71) and further outward than bottom wall 71. A lower end of outer wall 73 and a lower end of wall 76 are flush.

Each of four couplers 74 couples a corner of inner wall 72 to a corner of outer wall 73 that faces the corner of inner wall 72. Couplers 74 extend from an upper end of outer wall 73 to the lower end of outer wall 73 in the up-down direction. Gaps S3 are formed between inner wall 72 and outer wall 73 coupled by couplers 74.

Lid 80 closes open face 73a of outer wall 73, which faces bottom wall 71, to form gap S4 between lid 80 and bottom wall 71. Lid 80 includes lid body 81 having a rectangular plate shape and fitting portions 82 formed on an upper surface of lid body 81. Fitting portions 82 are formed in low-height rectangular tube shapes, the portions of which corresponding to four couplers 74 are cut away. Fitting portions 82 are made slightly thicker than gaps between outer wall 73 and wall 76. Lid 80 is fixed to case body 70 by press-inserting fitting portions 82 into the gaps between outer wall 73 and wall 76. At this time, in order to increase fixing strength, an adhesive may be applied to wall surfaces of each of fitting portions 82 which make contact with outer wall 73 and wall 76.

Within case 6, capacitor element unit 5 is supported by projections 75 and held slightly separated from bottom wall 71. The upper surface of filler resin 7 is located above capacitor element 50, and capacitor element unit 5 is fixed within case 6 by cured filler resin 7. In a state in which capacitor element unit 5 is housed in case 6, each of a leading end of first terminal 61a of first bus bar 61 and a leading end of second terminal 62a of second bus bar 62 protrudes outward from case 6.

Film capacitor 1B of the present exemplary embodiment can also be directly mounted on a printed substrate (not shown) in the same manner as film capacitor 1A of the first exemplary embodiment.

Effects of Second Exemplary Embodiment

Since case 6 has a double-walled structure that is composed of inner wall 72, outer wall 73, bottom wall 71, and lid 80, it is possible to suppress leakage of noise caused by vibration of capacitor element 50 from case 6. Additionally, since inner wall 72 and outer wall 73 are integrally formed, gaps S3 between inner wall 72 and outer wall 73 do not vary depending on manufacturing operation conditions, intended gaps S3 can be ensured, and a stable noise suppression effect is expected.

Further, since case 6 is configured such that the corners of inner wall 72 and the corners of outer wall 73 being coupled by couplers 74 respectively, each corner of inner wall 72 has rigidity higher than a region between the two corners of inner wall 72, and is less susceptible to vibration when capacitor element 50 vibrates. Thus, propagation of vibration (noise) from inner wall 72 to outer wall 73 through coupler 74 can be reduced and improvement in noise suppression effect can be expected.

MODIFICATION EXAMPLES

Although the exemplary embodiments of the present disclosure have been described above, the present disclosure is not limited to the exemplary embodiments described above, and furthermore, various modifications can be applied to application examples according to the present disclosure besides the exemplary embodiments described above.

Figure 9:
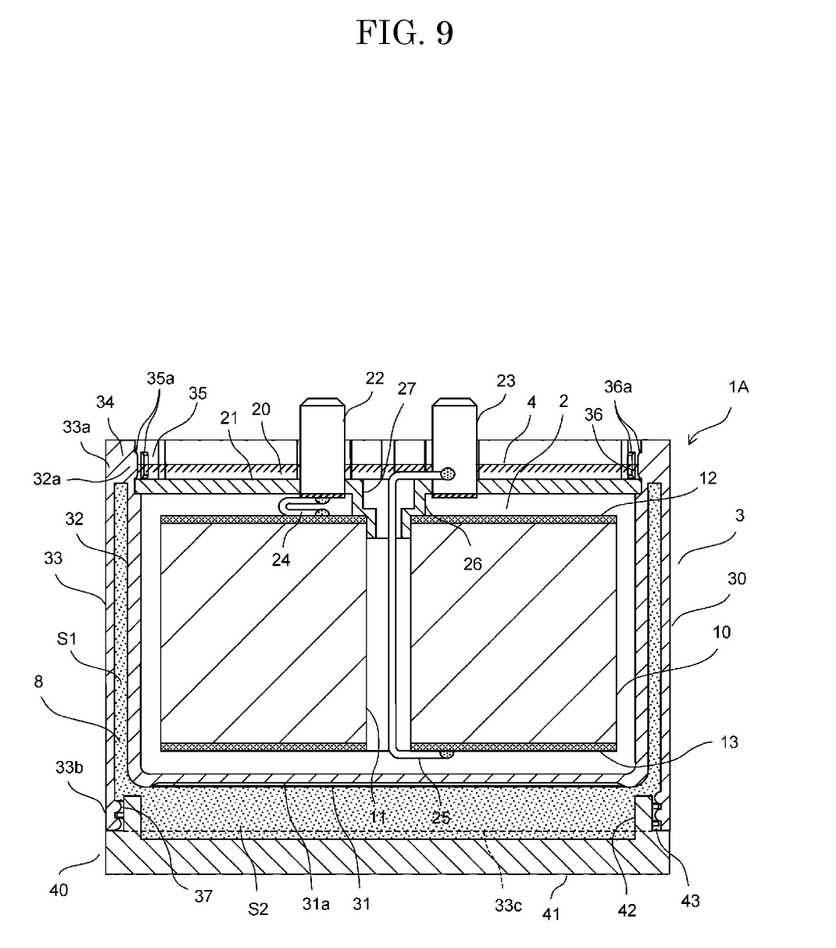
FIG. 9 is an explanatory diagram illustrating a film capacitor according to a modification.

For example, in film capacitor 1A of the first exemplary embodiment, gap 51 between inner wall 32 and outer wall 33 and gap S2 between bottom wall 31 and lid 40 are air layer. However, as shown in FIG. 9, gaps S1, S2 may be filled with noise-absorbing material 8. Examples of noise-absorbing material 8 can include a known noise-absorbing material, such as glass wool, rock wool, or felt. Thus, it is expected that leakage of noise from case 3 is further suppressed. It should be noted that, also in film capacitor 1B of the second exemplary embodiment, gaps S3 between inner wall 72 and outer wall 73 and gap S2 between bottom wall 71 and lid 80 may be filled with a noise-absorbing material.

Figure 10A:
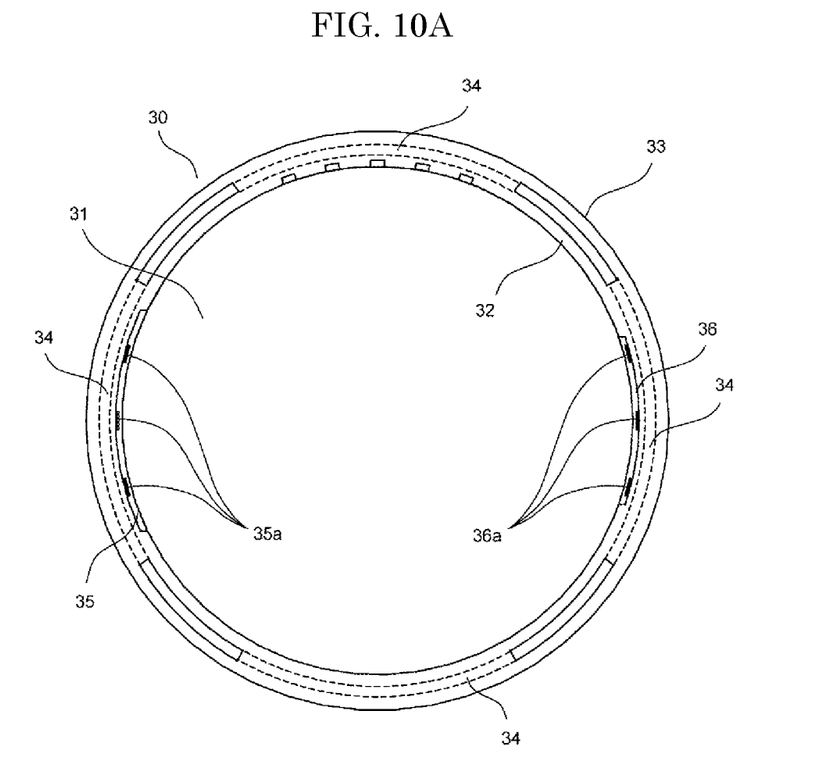
FIG. 10A is an explanatory diagram illustrating the film capacitor according to the modification.

Furthermore, in film capacitor 1A of the first exemplary embodiment, coupler 34 is continuously provided between the entire periphery of upper end 32a of inner wall 32 and an entire periphery of upper end 33a of outer wall 33. However, as shown in FIG. 10A, coupler 34 may be intermittently provided over the entire circumference between upper end 32a of inner wall 32 and upper end 33a of outer wall 33. In this case, from the viewpoint of strength, coupler 34 is preferably located at portions of inner wall 32 where first receiving portion 35 and second receiving portion 36 are formed.

Figure 10B:
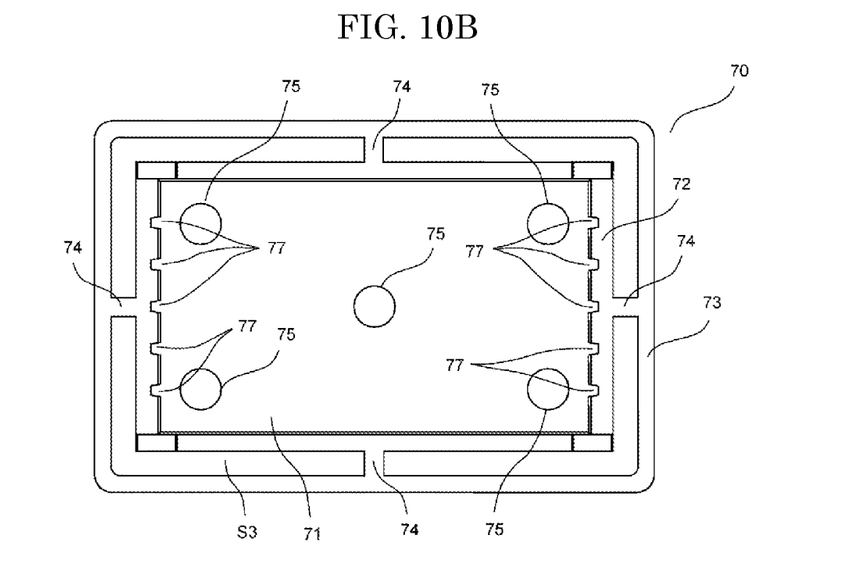
FIG. 10B is an explanatory diagram illustrating the film capacitor according to the modification.

Moreover, in film capacitor 1B of the second exemplary embodiment, the corners of inner wall 72 and the corners of outer wall 73 are coupled by couplers 74 respectively. However, each of couplers 74 does not have to be located at a corner, and for example, as shown in FIG. 10B, may be located in a central position between two corners.

Moreover, in film capacitor 1A of the first exemplary embodiment, case body 30 and lid 40 may be fixed by a press-fitting method as in film capacitor 1B of the second exemplary embodiment, rather than by the screw method. In this case, inner wall 32 and outer wall 33 may be coupled by couplers that extend in the up-down direction, in the same manner as film capacitor 1B of the second exemplary embodiment. It should be noted that with the screw method, it is necessary to rotate case body 30 to remove case body 30 from a mold when molding case body 30, and therefore couplers such as in film capacitor 1B of the second exemplary embodiment cannot be provided.

Moreover, in film capacitor 1B of the second exemplary embodiment, the configuration may be such that a coupler is continuously provided over the entire circumference between the upper end of inner wall 72 and the upper end of outer wall 73 as in the first exemplary embodiment.

Moreover, in the first exemplary embodiment and the second exemplary embodiment, capacitor element unit 2, 5 is configured from a single capacitor element 10, 50. However, the present disclosure is not limited to this configuration, and capacitor element unit 2, 5 may be configured from a plurality of capacitor elements 10, 50.

Moreover, in the first exemplary embodiment and the second exemplary embodiment, capacitor element 10, 50 is formed by stacking two metalized films, which are made by vapor-depositing aluminum onto dielectric films, and winding or the like the stacked metalized films. However, in addition to this, capacitor element 10, 50 may be formed by stacking an insulating film and a metalized film that is made by vapor-depositing aluminum onto both sides of a dielectric film, and winding or the like the stacked films.

Moreover, in the first exemplary embodiment and the second exemplary embodiment, film capacitors 1A, 1B are taken as an example of a capacitor of the present disclosure. However, the present disclosure may be applied to capacitors other than film capacitors 1A, 1B.

In addition, various modifications can be appropriately made to the exemplary embodiments of the present disclosure within the scope of the technical idea disclosed in the claims It should be noted that, in the description of the above-described exemplary embodiments, a term indicating a direction, such as "upward" or "downward", indicates a relative direction that only depends on a relative positional relationship of constituent members, and does not indicate an absolute direction, such as a vertical direction or a horizontal direction.

The present disclosure is useful for capacitors used for various types of electronic devices, electrical devices, industrial equipment, electric components for vehicles, and the like.

What is claimed is:

1. A capacitor comprising:
a capacitor element;
a case that houses the capacitor element; and
a filler resin that fills an interior of the case, wherein:
the case includes a case body and a lid, the case body includes a bottom wall, an inner wall having a tube shape, an outer wall having a tube shape and surrounding the inner wall, and a coupler that couples the inner wall to the outer wall,
the inner wall rises from a peripheral edge of the bottom wall,
the outer wall extends further outward than the bottom wall in a direction from the case body to the lid, the direction being perpendicular to a main surface of the bottom wall,
the coupler forms a first gap between the inner wall and the outer wall,
the bottom wall, the inner wall, the outer wall, and the coupler are integrally formed, and
the lid closes an opening of the outer wall to form a second gap between the lid and the bottom wall, the opening facing the bottom wall.

2. The capacitor according to claim 1, wherein at least one of the first gap and the second gap is filled with a noise-absorbing material.

3. The capacitor according to claim 1, wherein:
the outer wall has a circular tube shape,
the outer wall includes a first threaded portion disposed on an inside surface of an open end portion of the outer wall,
the lid includes a second threaded portion disposed on a peripheral wall surface of the lid, the peripheral wall surface facing the open end portion, and
the second threaded portion meshes with the first threaded portion.

4. The capacitor according to claim 1, wherein:
the coupler couples a first end of the inner wall to a second end of the outer wall, the first end being far side from the bottom wall, the second end facing the first end.

5. The capacitor according to claim 1, wherein:
the inner wall and the outer wall each have a rectangular tube shape, and
the coupler couples a first corner of the inner wall to a second corner of the outer wall, the second corner facing the first corner.

* * * * *